United States Patent
Antaki

(10) Patent No.: US 9,626,588 B1
(45) Date of Patent: Apr. 18, 2017

(54) DETECTING AND LOCATING LASERS POINTED AT AIRCRAFT

(71) Applicant: Patrick Antaki, Plano, TX (US)

(72) Inventor: Patrick Antaki, Plano, TX (US)

(*) Notice: Subject to any disclaimer, the term of this patent is extended or adjusted under 35 U.S.C. 154(b) by 210 days.

(21) Appl. No.: 14/666,166

(22) Filed: Mar. 23, 2015

Related U.S. Application Data

(60) Provisional application No. 61/969,212, filed on Mar. 23, 2014.

(51) Int. Cl.
*G06K 9/52* (2006.01)
*G06K 9/46* (2006.01)
*G01V 8/00* (2006.01)

(52) U.S. Cl.
CPC .............. *G06K 9/52* (2013.01); *G01V 8/00* (2013.01); *G06K 9/4661* (2013.01); *G05B 2219/37288* (2013.01); *G05B 2219/37571* (2013.01)

(58) Field of Classification Search
CPC .......... G06K 9/52; G06K 9/4661; G01V 8/00; G05B 2219/37288; G05B 2219/37571
See application file for complete search history.

(56) References Cited

U.S. PATENT DOCUMENTS

| | | | | |
|---|---|---|---|---|
| 5,440,116 A * | 8/1995 | Bolander | ............. | G01S 7/4804 250/206.2 |
| 6,151,114 A * | 11/2000 | Russell | ............. | G01J 3/26 356/519 |
| 6,415,051 B1 * | 7/2002 | Callari | ............. | G01B 11/25 382/154 |
| 7,035,308 B1 * | 4/2006 | McNeil | ............. | F41H 3/00 342/1 |
| 7,683,310 B1 * | 3/2010 | Sinclair | ............. | G01S 7/4804 250/203.1 |
| 9,415,745 B1 * | 8/2016 | Clemen, Jr. | ............. | B60R 22/00 |
| 9,500,522 B2 * | 11/2016 | Mechtel | ............. | G01J 1/4228 |
| 2002/0179818 A1 * | 12/2002 | Gauthier, Jr. | ............. | G01J 1/18 250/206.1 |
| 2003/0234349 A1 * | 12/2003 | Wootton | ............. | G01S 3/783 250/226 |
| 2004/0104334 A1 * | 6/2004 | Gal | ............. | G02B 13/06 250/203.6 |
| 2012/0087542 A1 * | 4/2012 | Schertler | ............. | G01S 3/782 382/103 |

(Continued)

FOREIGN PATENT DOCUMENTS

| | | | |
|---|---|---|---|
| DE | 202013007522 U1 * | 1/2006 | |
| DE | 19851010 A1 * | 6/2007 | |
| WO | WO 2014057136 A3 * | 4/2014 | |

*Primary Examiner* — John Villecco

(57) ABSTRACT

The present invention provides various apparatus and methods for detecting laser beams, locating their origin, recording these events, and alerting law enforcement agencies as the event unfolds. The apparatus includes at least two communicably coupled camera systems coupled to one or more image processors. A method for detecting the laser beam includes the use of optical, temporal and two-dimensional spatial image filtering. A method for computing the location of the laser beam consists of performing geometric computations using triangulation techniques and physical surveying of the cameras. A method for communicating the location of the laser beam in real-time includes the use of wired or wireless communications means, including the coordination with local air traffic control information.

22 Claims, 5 Drawing Sheets

(56) References Cited

U.S. PATENT DOCUMENTS

| | | | | |
|---|---|---|---|---|
| 2012/0263347 | A1* | 10/2012 | Ichimaru | G01B 11/2518 382/103 |
| 2014/0192367 | A1* | 7/2014 | Jungwirth | G01S 7/495 356/614 |
| 2014/0274205 | A1* | 9/2014 | Goszyk | A61H 3/061 455/556.1 |
| 2015/0060652 | A1* | 3/2015 | Volfson | G01J 1/0266 250/227.11 |
| 2015/0195495 | A1* | 7/2015 | McEwan | G01J 3/02 348/144 |
| 2015/0332608 | A1* | 11/2015 | Williamson | G09B 23/22 348/208.14 |
| 2016/0144512 | A1* | 5/2016 | Kim | H04N 17/002 15/319 |
| 2016/0266228 | A1* | 9/2016 | Clemen, Jr. | G01S 3/782 |

\* cited by examiner

DETECTING AND LOCATING LASERS POINTED AT AIRCRAFT

FIELD OF INVENTION

The present invention relates generally to the field of laser threat detection, and more specifically to a system and method for detecting and locating lasers pointed at aircraft.

BACKGROUND ART

Without limiting the scope of the invention, The pointing of lasers towards flying aircraft is a current and evolving threat to civil, commercial, and government/military aviation worldwide. The number of incidents continues to grow, while the apprehension of perpetrators is significantly lagging. This situation is further aggravated by the easy availability of increasingly powerful consumer grade lasers in the multi-Watt range. For example, one can easily purchase a 2 Watt green laser pointer for about $200 on the Internet, made in China and delivered by the U.S. Postal Service. It is only a matter of time before either a malicious (e.g., terrorist, criminal) or a merely mischievous perpetrator startles or temporarily blinds the pilot of a passenger-bearing commercial airliner, precipitating a catastrophic, fatal crash. The FBI has a highly informative video on their webpage titled "Making a Point About Lasers".

It seems that the reason the perpetrator in this particular video was arrested was that his laser pointer happened to illuminate a police helicopter. Had it been any other kind of aircraft, he likely would not have been arrested.

Current approaches to address this problem include public awareness campaigns coupled with criminal sanctions and posted rewards for information; aircraft-based laser detectors; and eye protection shields for pilots.

While the public is slowly getting educated about the dangers of shining lasers skywards, relying on neighbors to report such illegal activity is not feasible due to the high directionality of the laser beam and the scattered energy. Usually the only people able to see the laser are the perpetrator and their target. Any other persons in the general vicinity cannot see the beam, and thus would not know to report it. Quite simply, a laser beam is almost impossible to see from off to the side.

Congress's heightened concern has led to laws criminalizing the pointing of lasers at aircraft with felony criminal and civil penalties. The FBI offers a $10,000 reward for information leading to an arrest, according to their webpage.

An FBI news release includes the following quotation:

"I can't stress enough how dangerous and irresponsible it is to point a laser at an aircraft," said FAA Administrator Michael Huerta. "We know that targeted enforcement has succeeded in driving down laser incidents in a number of cities, and we'll continue to partner with law enforcement to address this problem nationwide." In addition, the FAA has implemented procedures for airmen to report laser incidents (see FAA Advisory Circular number 70-2A on the subject of "Reporting of Laser Illumination of Aircraft").

And for years now the FAA has maintained a detailed database of reported incidents. In fact, the number of laser incidents has increased fourteen-fold since 2005, rising to nearly 4,000 in 2013 alone. More information about the threat is available at the FAA's website for the Laser Safety Initiative.

There exists a dangerous capability gap in protecting commercial aircraft at major airports from laser targeting during the most vulnerable phases of flight: approach and landing, and take-off. Advisory Circular number 70-2A (cited above) states the FAA's intent to "expeditiously locate the source of unauthorized laser transmissions." The Advisory Circular also talks about "[r]esearch . . . by Government and private industry focusing on technological solutions for enhancing aircrew safety during laser incidents." It is not clear whether such research currently includes real-time detection and location-finding technology described herein. Effective personal protective equipment for pilots is desirable, but it is an entirely passive measure and does nothing to catch perpetrators. The fullest measure of aviation safety can only be achieved through increased law enforcement effectiveness stemming from robust investment in innovative effective technology.

SUMMARY OF THE INVENTION

One embodiment of the present invention provides an apparatus that instantly detects when someone (or something) shines a laser at the sky, whether they succeed to illuminate an aircraft or not. This invention can alert law enforcement immediately, transmitting precise location data of the laser, enabling police to arrest the perpetrator in real time. The technology is 100% ground-based, so no FAA flight-worthiness testing or evaluation is required, thereby speeding real-world deployment.

Various embodiments of the present invention provide an apparatus and method for detecting and locating laser beams generally aimed skywards through the use of ground-based image sensors which are strategically emplaced in the vicinity of airports to detect skywards-emitting laser beams. Once the beam is detected by at least two inventive sensors, geometrical computations (similarly to how GPS works) are made, using the detected information from both sensors, to triangulate the source of the laser beam, resulting in a precise geodesic solution (LON/LAT/ALT or a street address). Upon detection and triangulation of a laser beam (which requires only a fraction of a second) local law enforcement is automatically alerted with a precise location of the perpetrator, which is the key real-time criterion to enable prompt apprehension. The system can detect a variety of real-world laser beams including short intermittent pulses, beams that wander the sky, and from both fixed and mobile locations (including moving vehicles). The data integrity built into the inventive system allows the record of the laser emission detection to be admitted as evidence in a courtroom for criminal prosecution.

By deploying a series of sensors around an airport and along the flight paths, the detection probability of any skywards-aimed laser beam in the covered regions is very high—even if the perpetrator fails to illuminate the target aircraft with the beam (i.e., a "miss", a "near-miss" or an intermittent "hit"). The system may also be fed with, or interact with, Air Traffic Control (ATC) data, instantly identifying the targeted aircraft as well as warning other pilots flying through the affected airspace.

Each sensor site consists of one or more image sensors (specialized electronic cameras) with appropriate optics and digital image processing (a computer) to detect laser beams. A means of communications (such as wireless data using the local cell phone network) is used by each sensor site to automatically coordinate with other local sensor sites and triangulate the laser source. The number and placement of sensor sites (all are unmanned) are unique to each airport due to geography, landscape, background lighting, takeoff/approach/holding patterns, and other factors.

One problem which the invention solves is a means to detect and to locate, in real-time, the source of lasers pointed at skywards, in the presence of typical nighttime light pollution which is common in and around urban and suburban areas and particularly around airports. Due to the strong directionality of a laser beam, most of the laser's energy is directed towards the line-of-beam (e.g., in the direction of the beam). Only a very small fraction of the light energy is scattered to other angles, allowing for the detection of the beam from an off-axis location. In a common scenario, the beam is highly visible from its source as well as from its target for miles. However, an observer or conventional electronic cameras that are close-by but not directly on-axis may not detect the laser beam, due to its high directionality and low divergence. Particles in the atmosphere along the travel path of the beam cause scattering of that energy which generally emanate at random angles from the beam's direction. These particles include pollution, insects, smog, dust, and other larger objects in the sky (power lines, trees, birds, etc.) The interaction of the laser beam with very small particles (at the molecular level) is described by Rayleigh scattering. In this case, the scattered energy is generally stronger along angles of the beam's travel, and weaker at greater angles. All this unequal scattering renders the detection of the laser beam difficult, due to the small amount of scattered energy (in the case where one does not know the location of the emitter a priori).

Scattering (or reflection) of the laser beam from the surface of the target is not as useful for detecting the source of the beam. This is due to several factors. First, the probability of a "hit" (the beam impinging upon the target aircraft) is low, as compared to the frequency of attempted "hits" by perpetrators (a failed attempt is still considered a crime and apprehension in this instance is still highly desirable). Secondly, the reflection of the beam on the aircraft is a large spot (due to the divergence of the beam at the relatively large distance from the beam's source to the target aircraft); assuming that the surface of the target is a perfect mirror (not realistic), then the accuracy of the solution is severely diminished due to the large beam width, which is roughly doubled due to the round trip of the beam (from the laser to the target aircraft, and then back again from that aircraft to the detector site), thus not allowing adequate precision in the detection of the location of the laser's source. Finally, the surface of the target, over the size of the beam width at the target, is not uniform, and further scatters the reflected energy in many directions, making it practically impossible to determine the source of the beam by use of the target reflection, as well as with even smaller levels of energy reflecting back to the detector. The invention makes use of the laser beam signature "on its way up" towards the aircraft.

Another significant difficulty in the detection of such a beam is the level of background illumination (at a variety of wavelengths, including the human non-visible infrared range). In a typical scenario where the apparatus of this invention may be used, urban and airport or close-to-airport environments are full of light pollution (again, in both the visible and the infrared bands). The amount of light pollution, we call here background light, may be further reflected back by clouds, making the detection of a very low energy scattered laser signal that much more difficult.

In order to detect a laser beam (which possesses the unique characteristic of a very straight line, against a background containing virtually no similar feature), the invention utilizes a combination of techniques. One technique is to use an optical filter with one or more narrowband characteristic in order to reduce the total contribution of the background light that impinges upon the electronic sensor (typically a sophisticated electronic camera); this technique is possible since the wavelengths of most consumer-grade lasers are well known. For example, very narrowband Green and Red filters may be used to eliminate light from all other wavelengths. It is possible to use dielectric film optical filters with very high wavelength selectivity, with almost 100% passband efficiency and very high out-of-band rejection.

The camera is configured to capture and to transmit to a computer images at frame rates that can capture, detect, and analyze moving as well as time-intermittent laser signals (which is characteristic of a person holding a laser by hand but not too steadily). Once the signal has been captured from the camera into a computer, digital image processing is applied to each image in order to accentuate the laser beam. Some of the image processing techniques include contrast enhancement, which may be applied on a line-by-line basis, over a region-of-interest, as well as over the complete image frame. Other typical digital filtering may also be applied, depending upon the particulars of each installation. Subsequently, a straight line characteristic (if it exists within the image) is extracted. Note that a line need not be present over the whole field-of-view, but a sufficiently short straight line segment is adequate to establish the presence of a laser beam (as there are typically no other such features occurring in the sky). Once a line has been detected, its angle and location within the camera's field-of-view are extracted. Next, this data is combined with the cameras exact physical location, azimuth and elevation (when that particular image frame was acquired) in order to translate the image-detected line into a locus of physical locations that correspond to the source of the laser beam (typically, but not restricted to a location at or close to the surface of the earth). Again, note that the detection of the beam in the image need not see the beam at ground-level, as any straight line segment in the sky may be extrapolated back to the local ground surface (which itself may not be flat). One advantage of pointing the camera at a higher angle of elevation is the reduced amount of background illumination, albeit the scattered signal also tends to be lower energy. A classic signal-to-noise analysis may be made to determine the optimum elevation for each particular installation location and azimuth.

The solution that is computed from a single detector site results in a ground location consisting of a line, rather than a point, since the there is no depth information available when the detection is from the perspective of a single viewer (or a single detector). This is the same phenomenon as the need for both eyes in order to obtain some depth perception; with a single eye, the viewed object (excluding contextual knowledge of the object) may be at any distance. A laser beam has no context, as it is literally a very thin and straight line. Thus, a secondary imaging site, physically located at a different site, but able to observe the same general region as the first imaging site, is required in order to triangulate the location of the emitting laser to a point.

A second detector system, identical or similar to the first one, is emplaced at another location. The relative location of each detector system may be made by taking into account a variety of considerations, including distance, flight paths, terrain, population densities, weather norms, desired accuracies, camera sensitivity, size of fields-of-view, and other practical considerations. Both sensors have a means of communicating with each other, or to a third site. The communicated solutions from both sensors, each providing a locus in the form of a line (at the local surface of the earth), are combined to yield a point, which is located at the geometric intersection of both lines. This point (the intersection of the two lines) represents the physical location of the laser beam source. That information may be immediately and automatically communicated to local law enforcement agencies, the local airport, the FAA, or other regulatory agencies, as well as logged and cataloged. Other information regarding the laser beam includes its motion in time (be it from a moving source, or the source is waiving the beam in the sky), time-of-day, the wavelength of the beam, its time modality (pulsing, continuous, etc.) All this information may be used in the apprehension and subsequent prosecution of perpetrators. All that information, including the video recording of the detected laser is stored in the inventive computer.

In an installation for a large airport, a multitude of detector sites may be utilized in order to increase the overall physical range of detecting skywards laser beams, such as along the flight path, or other strategic areas. Since it is common for lasers to be shined at helicopters (in addition to commercial aircraft), one may conceive of a larger fixed set of detector sites to cover an entire urban area, including any local airports or heliports. Detector sites may be emplaced in a combination of fixed and mobile sites.

Depending upon the geographical arrangement of each sensor site, it is possible that more than two sensors may detect the same beam. In that case, the final computed point solution is statistically reinforced with the results from a third or more sensors.

The invention described herein is capable of detecting more than a single laser beam simultaneously. When such an instance occurs, the line-feature extraction algorithm within the image processor reports multiple detected laser lines and computes multiple ground-based locus lines to locate each of the beams sources individually. Such a feature may be of particular benefit in a military battlefield application where the likelihood of multiple simultaneous lasers is greater (such as when multiple separate ground troops pointing their individual lasers towards the same or multiple aircraft). In this scenario, it is possible that multiple aircraft flying in formation (such as helicopters), may each contain a single detector and can coordinate their solutions to precisely the source of a laser from an enemy on the ground. Note that in this scenario, none of the detectors is fixed, and the solution may be computed both relative to one or more moving aircraft, as well as, if augmented with navigational information, as a geodesic location.

In order to perform the computation to identify the locus (a line on the earth) of the physical location of the detected laser beam source, it is necessary to know the physical location of the detector site (such as in terms of longitude, latitude). This may be accomplished through the use of GPS or other well-established surveying techniques. Additionally, it is also necessary to know the azimuth (but not necessarily the elevation) of the camera (e.g., where is the camera aimed at?) This information may be obtained from a combination of surveying techniques, as well as rotary encoders built into the camera system which can communicate the camera's pointing angle (azimuth) at any time.

One additional embodiment of the invention described herein includes the ability for the camera (within each detector site) to scan the horizon (mechanically, electronically, optically), similarly to old-fashioned radar systems with rotating antennae. When a beam is detected, the range of scanning may be reduced to a smaller azimuth range-of-interest. Additionally, the camera may also be further scanned in the vertical direction (elevation), in order to further increase the probability of detection of a beam (due to the time- and elevation-varying impact of background illumination). In all cases, the instantaneous azimuth of the camera is known and utilized by the computer to generate the solution.

One additional embodiment of the invention includes the coordination of the detector sites scanning in a pattern that is directed from other data sources. For example, the scanning may be generally weighed towards approaching aircraft, for a certain geographical range of interest. Such scanning information is fed from the local airport radar, or even from telemetry from the approaching aircraft itself (transmitting its GPS location to the invention). The purpose of such coordinated scanning is to increase the probability of detecting a laser beam, by "focusing" the search for such a beam in a smaller region (thus increasing the camera or the digital processing sensitivities). Generally, when one reduces the size of the space (or volume) that is searched (through the use of optical means such as zoom lenses, or electronic means through increased integration time in the camera over a smaller field-of-view), the system's sensitivity is increased.

In yet another embodiment of the invention, one or more of the detector sites may be mobile (e.g., on a moving vehicle, a water-born craft, or even airborne on a helicopter or an Unmanned Aerial Vehicle). In such a situation, the physical location of the detector system must be derived from methods such as GPS, or aircraft navigation signals, as well as the azimuth of the camera. The invention is not restricted to the use of a non-mobile detector site, nor to one (or more) detector site that is earthbound, nor to a fixed stare (not scanning), nor to a pre-determined scan pattern (it may utilize random or other scanning patterns).

BRIEF DESCRIPTION OF THE DRAWINGS

Further benefits and advantages of the present invention will become more apparent from the following description of various embodiments that are given by way of example with reference to the accompanying drawings.

DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Various embodiments of the present invention provide an apparatus and method for detecting and locating the emanating source of laser beams. Most often, the apparatus and method are used for apprehending perpetrators who are aiming laser beams at flying aircraft.

One embodiment of the present invention will now be described in more detail in reference to FIGS. 1-7. The present invention is not limited to this embodiment as it is provided for illustrative purposes only.

Figure 1:
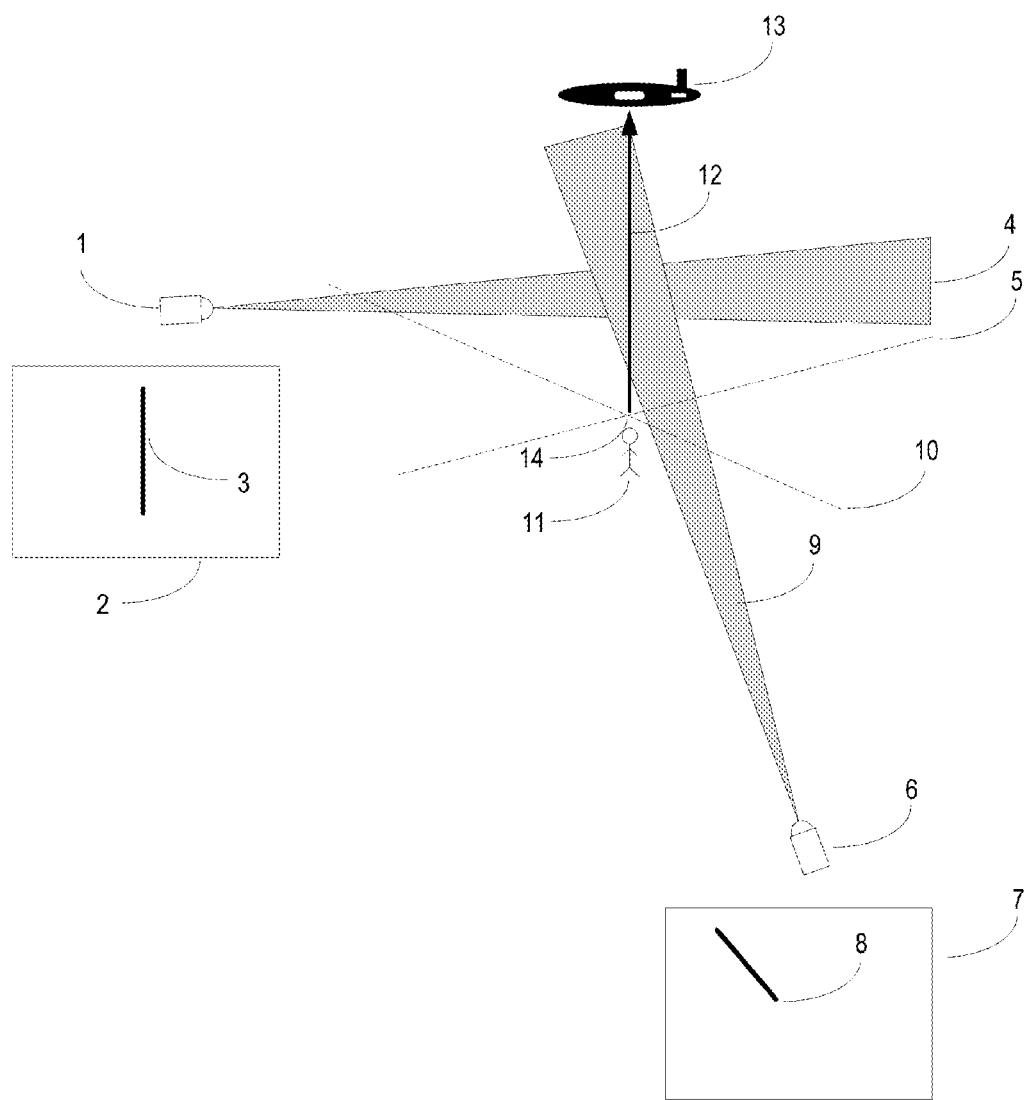
FIG. 1 is a high-level block diagram of a system with two detectors in accordance with one embodiment of the present invention.

FIG. 1 is a high-level block diagram of a system with two detectors in accordance with one embodiment of the present invention. In this system, the first detector is comprised of a camera (1) with an imaged field-of-view (2), a detected laser beam (3) with a particular angle and location within field-of-view (2), a physical field-of-view (4), and a computed physical locus line (5) representing the possible locations of the laser emitter (11). Similarly, the second detector is comprised of a camera (6) with an imaged field-of-view (7), a detected laser beam (8) with a particular angle and location within field-of-view (7), a physical field-of-view (9), and a computed physical locus line (10) representing the other possible locations of the laser emitter (11). Perpetrator (11) is emitting a laser beam (12) at aircraft (13). The computed locus of the two detectors' solutions (5) and (10) intersect at point (14), which matches the physical location of perpetrator (11).

Figure 2:
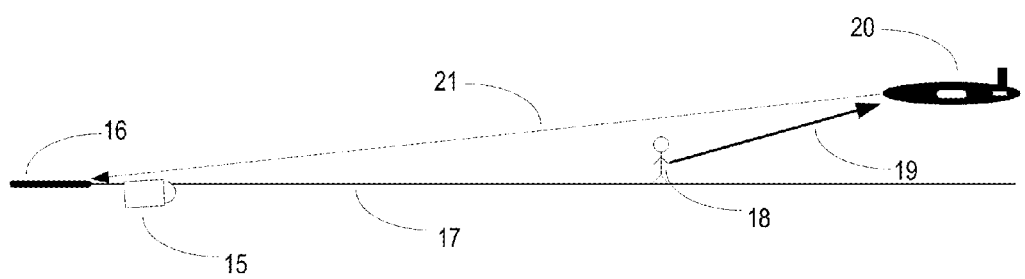
FIG. 2 is a diagram of a detector system located in the general vicinity of an airport in accordance with one embodiment of the present invention.

FIG. 2 is a diagram of a detector system located in the general vicinity of an airport in accordance with one embodiment of the present invention. In this figure, camera (15), which is part of a detector system including a computer and a means of communications, is located in the vicinity of an airport. Camera (15) has within its physical field-of-view approaching aircraft (20) with an approach line-of-flight (21) towards runway (16). Perpetrator (18) is shining a laser whose beam (19) impinges approaching aircraft (20). The level ground line (17) is the straight-line imaginary line linking camera (15) to perpetrator (18).

Figure 3:
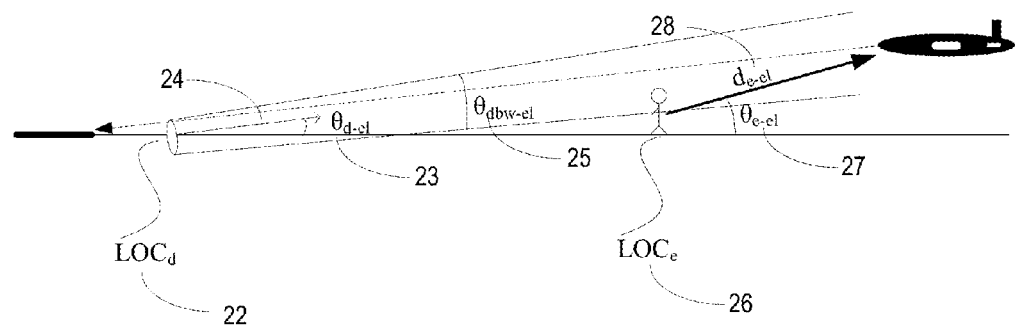
FIG. 3 is a diagram of the critical angles of a detector system located in the general vicinity of an airport in accordance with one embodiment of the present invention, as viewed from the side.

FIG. 3 is a diagram of the critical angles of a detector system located in the general vicinity of an airport in accordance with one embodiment of the present invention, as viewed from the side. This diagram depicts the elevation-related geometric parameters which the detector computer utilizes or detects in order to compute the location of perpetrator (26) shining a laser beam at the approaching aircraft on flight path (24). LOCd (22) is the physical location of one of the detectors, expressed in any one of several geometrical parameters (e.g., latitude/longitude/altitude, street address, or even a location in relation to another known location, etc.) θd-el (23) represents the elevation angle of the detector camera. θdbw-el (25) represents the angular field-of-view in the elevation direction of the detector camera. LOCe (26) represents the physical location of the perpetrator, again expressed in any one of several geometrical parameters. θe-el (27) represents the elevation angle of the perpetrator laser beam (pointed towards the approaching aircraft or generally skywards). de-el (28) represents the line-of-sight distance of the emitter to the target aircraft (note that this information is not necessary for the computation of the perpetrator's location).

Figure 4:
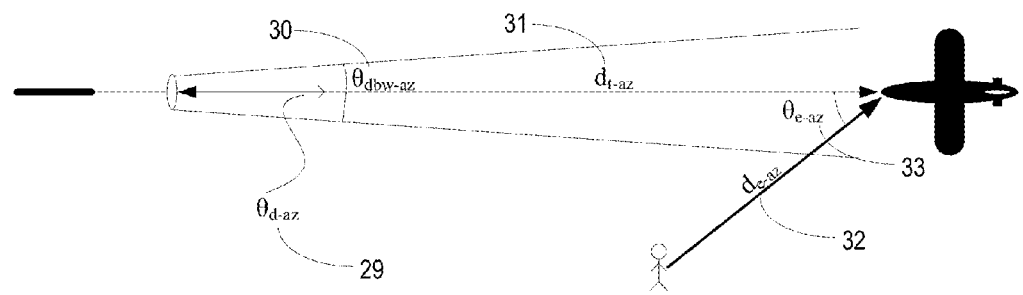
FIG. 4 is a diagram of the critical angles of a detector system located in the general vicinity of an airport in accordance with one embodiment of the present invention, as viewed from the top.

FIG. 4 is a diagram of the critical angles of a detector system located in the general vicinity of an airport in accordance with one embodiment of the present invention, as viewed from the top. This diagram depicts the azimuth-related geometric parameters which the detector computer utilizes or detects in order to compute the location of perpetrator (26) shining a laser beam at the approaching aircraft on flight path (24). θd-az (29) represents the azimuth angle of the detector camera (this angle is expressed in any one of several absolute or relative angular expressions). θdbw-az (30) represents the angular field-of-view in the azimuth direction of the detector camera. θe-az (33) represents the azimuth angle of the perpetrator laser beam (pointed towards the approaching aircraft or generally skywards). de-az (32) represents the line-of-sight distance of the emitter to the target aircraft (note that this information is not necessary for the computation of the perpetrator's location). dt_az (31) represents the distance of the target aircraft to the detector (note that this information is not necessary for the computation of the perpetrator's location).

Figure 5:
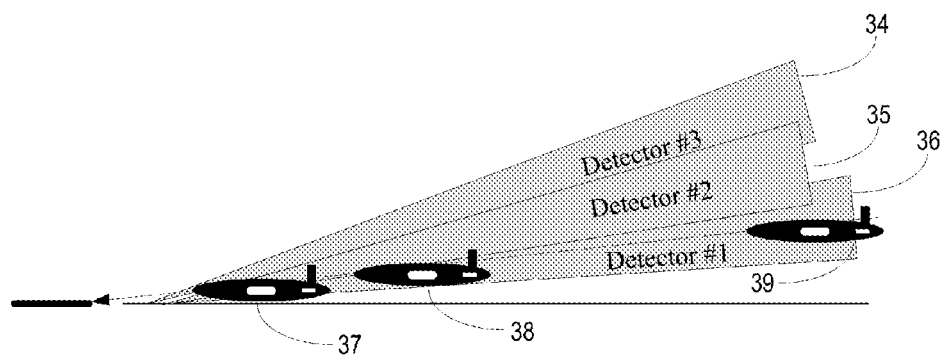
FIG. 5 is a diagram depicting multiple detectors in accordance with one embodiment of the present invention.

FIG. 5 is a diagram depicting multiple detectors in accordance with one embodiment of the present invention, as shown from the side view. Each detector may be aligned to cover unique but somewhat overlapping fields-of-view (34), (35) and (36). Each field-of-view can be optimized for the detection of beams in the vicinity of aircraft at various relative locations to the airport and to each detector.

Figure 6:
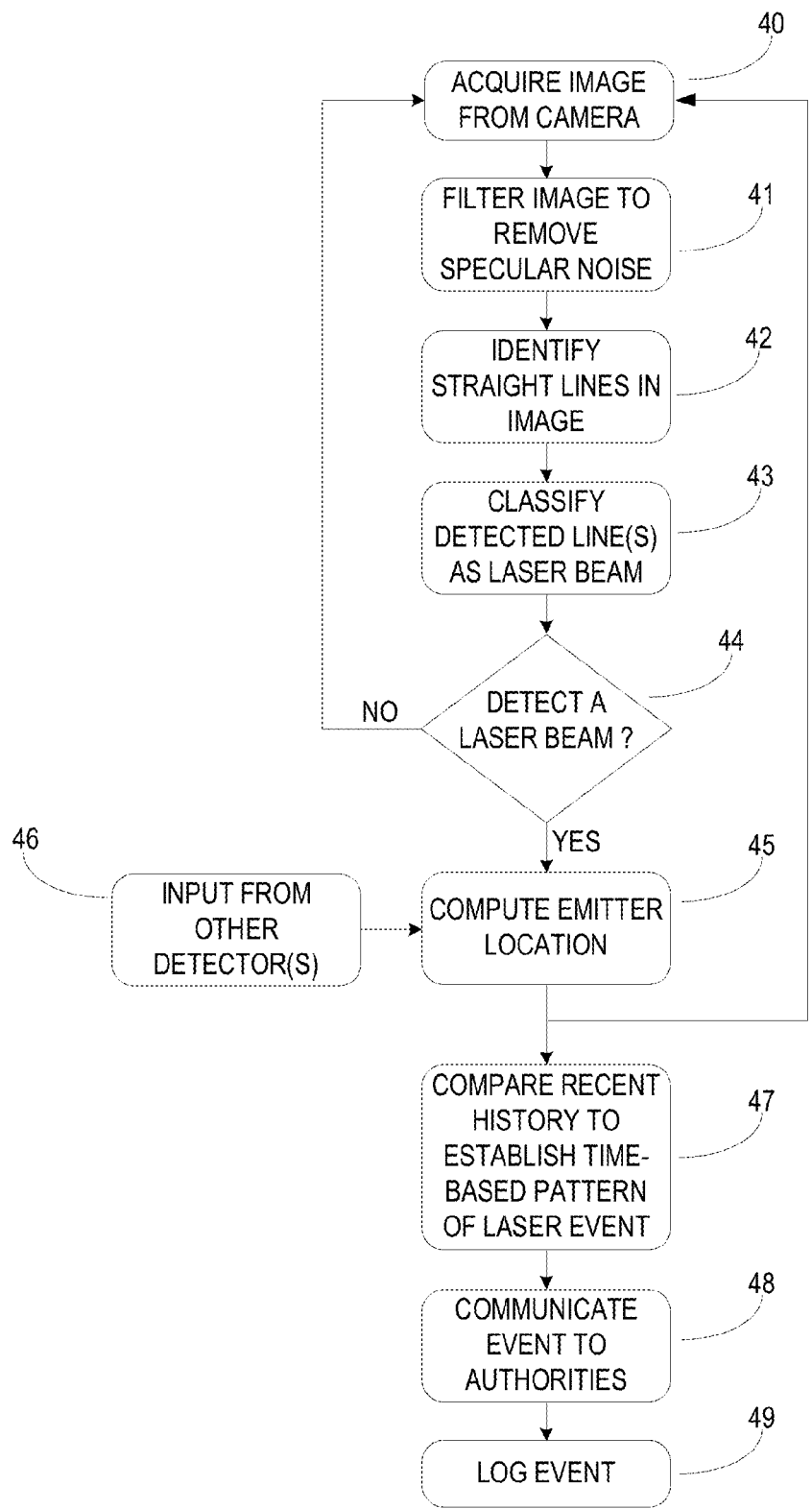
FIG. 6 is a process diagram depicting the general algorithmic steps for the operation of the detector system in accordance with one embodiment of the present invention.

FIG. 6 is a process diagram depicting the general algorithmic steps for the operation of the detector system in accordance with one embodiment of the present invention. The first step of the process (40) is to acquire a digital image from an electronic camera (such as a CCD, EM-CCD, CMOS, or other sensitive area imaging sensors) and to provide this image to a computer (typically an image processing computing device co-located with the camera). The optics for focusing, setting the field-of-view, filtering, and other optical functions are generally pre-determined for the specific configuration of a detector installation. Once the image is received by the computer, the rest of the processing is performed in the digital domain. The first step is to perform filtering of the image (41). This filtering function can include filters to remove specular noise. Other functions include contrast enhancement, which may be performed in a series of combinations of steps, to include computation of the contrast histogram over the whole image field, over each line, or even over portions of the image (such as a region-of-interest within the fuller field-of-view). Once the image has been pre-filtered, a search within the image (42) is made to identify the characteristic of a laser beam, which is a thin straight line but not of known length within the field-of-view. The result of this search may yield one or more possible straight line segments within the field-of-view. In addition to laser beams, certain objects may create a potential straight line segment, such as horizontal power lines, or distinct towers or buildings. A further reclassification filter (43) is made to eliminate straight lines that are not laser beams (such as previously surveyed artifacts), or straight lines deemed too short for positive identification as a laser, or even lines whose angles are too low in the horizon. The final result of this computation is to decide if a laser beam has been detected (44), using the current processed image, including trending information (e.g., was that line present previously for a long time?) and possibly with further correlation with other detectors. If the answer is affirmative, then that resulting detected beam's characteristics are merged with inputs from at least one other inventive detector (46) (after a communicative process) in order to compute the emitter location (45). If the determination is made that no laser beam is detected, the system returns to the search for beams in the next time frame. Note that the time from the acquisition of one image to the next can be very fast in relation to the turning-on or turning-off of lasers, on the order of milliseconds. When a perpetrator location is computed, time-varying data regarding the beam is further recorded and analyzed (47), to establish a time-pattern of the incident (to compute, for example, if the beam is wandering in the sky, how often it is turned-on, etc.) This data is useful for further reinforcing the information gathered regarding a laser shining event, which lasts longer than a single imaging frame's time duration. Such information can further help in criminal investigations and prosecution. Note that the sequence of images can be recorded digitally during, as well as prior to and following, a laser shining event (in a similar fashion to traffic red-light violation cameras). Details of the laser shining event, having been detected, classified, and its source computed by the invention (all within a fraction of a second), are communicated in real-time to local law enforcement agencies (48) as well as logged and stored in the inventive system (49). The end result of this process is to immediately detect, locate, log, record and communicate a laser shining event for the purpose of apprehension and criminal prosecution.

Figure 7:
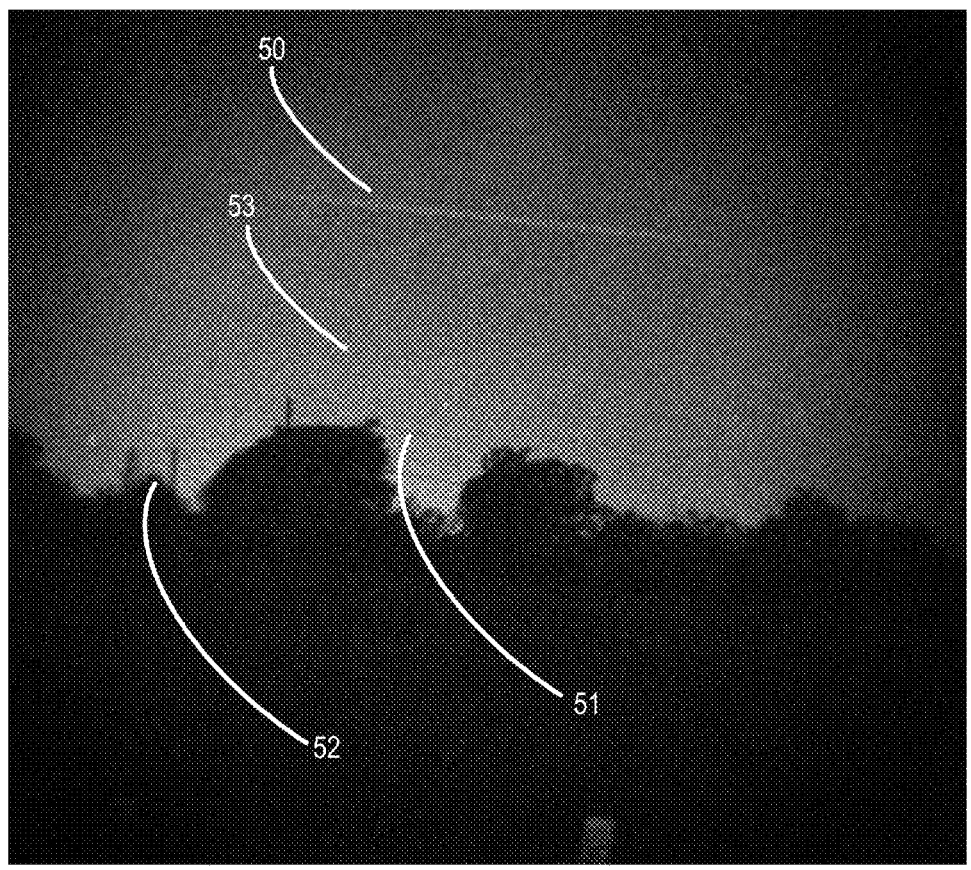
FIG. 7 is an image from a detector camera showing the various elements of the imaged scene in accordance with one embodiment of the present invention.

FIG. 7 is a recorded image from a detector camera showing the various elements of the imaged scene in accordance with one embodiment of the present invention. Laser beam (50) is visible in the post-processed digital image (this beam is not visible to the naked eye, nor to conventional digital cameras). The beam is orthogonal (approximately at a 90-degree angle) to the detector camera, representing a very weak signal, due to the directionality of Rayleigh scattering. Horizontal power lines (51) are also visible, as is tree line (52). Nightglow, or background illumination (53) is present, and is generally at a higher magnitude for the lower elevations, which cause the detection of the laser beam to be more difficult in this region. In this particular example, a 2 Watt green laser (purchased online from a Chinese manufacturer and delivered via normal post mail) was aimed at the sky at 9:30 PM (sunset was 6:40 PM on that particular day), in a dense urban location in the United States. A very sensitive and high dynamic range camera was used with a narrowband green filter and a frame rate of 60 frames per second.

The invention claimed is:

1. An electro-optical method for detecting the presence of one or more laser beams pointed skyward comprising the steps of:
   providing a first apparatus for acquiring a first electronic image of a first scene or first region, the first apparatus comprising a first image detector camera configured to acquire an image of the first scene facing the first camera, and at least one communicably coupled digital image computing processors;
   acquiring the first electronic image of the first scene using the first image detector camera;
   modifying the first electronic image based on one or more image improvement parameters using the one or more communicably coupled digital image processors to generate a modified first image; and
   determining the existence or non-existence of a thin straight line within the modified first image to determine the presence of the one or more laser beams.

2. The electro-optical method as recited in claim 1, further comprising a second apparatus similar in function to the first apparatus, acquiring a second scene image facing a second image detector camera of the second apparatus, whereby the second scene image is physically different from the first scene.

3. The electro-optical method as recited in claim 2, further comprising a first communications coupling between the first and the second apparatus.

4. The electro-optical method as recited in claim 3, further comprising a second communications coupling between the first and/or second apparatus and an external communications channel, communicating:
   a presence of said one or more laser beams;
   a location of the source of said one or more laser beams; or
   a location of air traffic in the vicinity of the first and/or second apparatus.

5. The electro-optical method as recited in claim 2, where at least one of the first and second apparatus is mechanically fixed to a single location.

6. The electro-optical method as recited in claim 2, where at least one of the first and second apparatus is not mechanically fixed to a single location.

7. The electro-optical method as recited in claim 2, where at least one of the first and second apparatus is mechanically, optically and electronically fixed to one angular position.

8. The electro-optical method as recited in claim 2, where at least one of the first and second apparatus is mechanically, optically or electronically scanned to one or more angular positions.

9. The electro-optical method as recited in claim 1, where a position and pointing direction of the first apparatus is known.

10. The electro-optical method as recited in claim 9, where the position and pointing direction of the apparatus is known by any combination of the following means:
    survey at a time of installation of the first apparatus;
    navigational inputs from satellite or other electronic inputs;
    navigational inputs from inertial sensors;
    or physical sensors or encoders; encoders.

11. The electro-optical method as recited in claim 1, where the first image detector camera is preceded with one or more wavelength filters.

12. A system for detecting the presence of one or more laser beams pointed skyward comprising:
    a first apparatus comprising:
      a first image detector camera configured to acquire a first image of a first scene facing the first image detector camera, and
      one or more communicably coupled digital image computing processors acquiring the first image of the first scene using the first image detector camera, modifying the first image based on one or more image improvement parameters using the one or more communicably coupled digital image computing processors to generate a modified first image; and, determining the existence or non-existence of a thin straight line within the modified first image to determine the presence of the one or more laser beams.

13. The apparatus as recited in claim 12, further comprising a second apparatus similar in function to the first apparatus, acquiring a second scene image facing a second image detector camera of the second apparatus, whereby the second scene image is physically different from the first scene.

14. The apparatus as recited in claim 13, further comprising a first communications coupling between the first and the second apparatus.

15. The apparatus as recited in claim 14, further comprising a second communications coupling between the first and/or second apparatus and an external communications channel, communicating:
- a presence of said one or more laser beams;
- a location of the source of said one or more laser beams; or
- a location of air traffic in the vicinity of the first and/or second apparatus.

16. The apparatus as recited in claim 13, where at least one of the first and second apparatus is mechanically fixed to a single location.

17. The apparatus as recited in claim 13, where at least one of the first and second apparatus is not mechanically fixed to a single location.

18. The apparatus as recited in claim 13, where at least one of the first and second apparatus is mechanically, optically and electronically fixed to one angular position.

19. The apparatus as recited in claim 13, where at least one of the first and second apparatus is mechanically, optically or electronically scanned to one or more angular positions.

20. The apparatus as recited in claim 12, where a position and pointing direction of the first apparatus is known.

21. The electro-optical method as recited in claim 20, where the position and pointing direction of the apparatus is known by any combination of the following means: including;
- survey at a time of installation of the first apparatus;
- navigational inputs from satellite or other electronic inputs;
- navigational inputs from inertial sensors; or
- physical sensors or encoders; encoders.

22. The apparatus as recited in claim 12, where the first image detector camera is preceded with one or more wavelength filters.

* * * * *